(12) United States Patent
Gerhardt et al.

(10) Patent No.: US 8,128,162 B2
(45) Date of Patent: Mar. 6, 2012

(54) ARMREST ASSEMBLY FOR A SEAT

(75) Inventors: Torsten Gerhardt, London (GB); Andrew John Murray, Colchester (GB); Will Farrelly, Chelmsford (GB); John K. Harding, Leigh-on-Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 12/730,646

(22) Filed: Mar. 24, 2010

(65) Prior Publication Data

US 2010/0259074 A1    Oct. 14, 2010

(30) Foreign Application Priority Data

Apr. 8, 2009 (GB) .................................. 0906113.6

(51) Int. Cl.
*B60N 2/46* (2006.01)
*B60N 2/48* (2006.01)
(52) U.S. Cl. .......... 297/61; 297/112; 297/113; 297/114; 297/408; 297/410
(58) Field of Classification Search ................. 297/112, 297/113, 114, 408, 409, 410, 411.32, 61
See application file for complete search history.

(56) References Cited

U.S. PATENT DOCUMENTS

| | | | | |
|---|---|---|---|---|
| 5,003,240 A * | 3/1991 | Ikeda | ........................ | 297/408 X |
| 5,011,225 A * | 4/1991 | Nemoto | ........................ | 297/408 |
| 5,346,282 A * | 9/1994 | De Filippo | ..................... | 297/395 |
| 5,433,503 A | 7/1995 | DeFilippo | | |
| 5,669,668 A * | 9/1997 | Leuchtmann | ................. | 297/408 |
| 5,681,079 A * | 10/1997 | Robinson | ........................ | 297/61 |
| 6,000,760 A * | 12/1999 | Chung | ........................ | 297/408 |
| 6,074,010 A * | 6/2000 | Takeda | ....................... | 297/408 X |
| 6,217,112 B1 * | 4/2001 | Linsenmeier et al. | ........ | 297/113 |
| 6,508,512 B2 * | 1/2003 | Saberan et al. | ............... | 297/408 |
| 6,572,188 B2 * | 6/2003 | Ozawa | ................. | 297/411.32 X |
| 6,860,564 B2 * | 3/2005 | Reed et al. | ..................... | 297/408 |
| 6,880,890 B1 * | 4/2005 | DeBrabant | ..................... | 297/408 |

(Continued)

FOREIGN PATENT DOCUMENTS

DE    4015872 C1    1/1992

(Continued)

*Primary Examiner* — Rodney B White
(74) *Attorney, Agent, or Firm* — Gregory P. Brown; Price Heneveld LLP

(57) ABSTRACT

An armrest assembly for a vehicle seat 5 comprises an armrest portion 11a, 11b, 11c, a shingle head restraint portion 12 moveably attached to one end of the armrest portion 11a, 11b, 11c, to permit the shingle head restraint 12 to be moved towards and away from the one end of the armrest portion 11a, 11b, 11c, and a height adjuster to selectively secure the head restraint 12 in one of a number of predetermined displaced positions relative to the armrest portion 11a, the armrest portion being moveable from a folded up position 11a to a folded down position 11c. The head restraint portion 12 is pivotably mounted for rotation about a substantially horizontal axis 14 and includes a head restraint rotation latching mechanism comprising a latching member biased into engagement with part of the head restraint 12 to hold the head restraint 12 in a preferred rotational position, and a means to automatically disengage the latching member only when the head restraint 12 is brought into close proximity to the armrest portion 11a to permit rotation of the head restraint portion 12 about the horizontal axis.

18 Claims, 12 Drawing Sheets

U.S. PATENT DOCUMENTS

| | | | |
|---|---|---|---|
| 6,899,395 B2 * | 5/2005 | Yetukuri et al. | 297/408 |
| 7,044,555 B2 * | 5/2006 | Saberan | 297/408 |
| 7,070,240 B2 * | 7/2006 | Schmitt et al. | 297/410 |
| 7,118,171 B2 * | 10/2006 | Fowler et al. | 297/61 |
| 7,178,865 B2 * | 2/2007 | Yetukuri et al. | 297/410 X |
| 7,237,843 B2 * | 7/2007 | Clark et al. | 297/408 |
| 7,258,400 B2 * | 8/2007 | Yamada | 297/408 X |
| 7,325,877 B2 * | 2/2008 | Brockman et al. | 297/408 |
| 7,341,312 B2 * | 3/2008 | Gauthier et al. | 297/408 |
| 7,422,280 B2 * | 9/2008 | Brockman | 297/408 X |
| 7,445,289 B2 * | 11/2008 | Neale | 297/408 |
| 7,478,860 B2 * | 1/2009 | Lawall et al. | 296/65.01 |
| 7,543,891 B2 * | 6/2009 | Chung | 297/408 |
| 7,552,973 B2 * | 6/2009 | Linardi et al. | 297/408 |
| 7,669,932 B1 * | 3/2010 | Gronninger et al. | 297/408 |
| 7,681,954 B2 * | 3/2010 | Barrou | 297/408 |
| 7,717,517 B2 * | 5/2010 | Yamane et al. | 297/408 |
| 7,758,126 B2 * | 7/2010 | Haase | 297/408 |
| 7,967,375 B2 * | 6/2011 | Yu et al. | 297/61 |
| 8,066,330 B2 * | 11/2011 | Keller et al. | 297/408 |
| 8,083,291 B2 * | 12/2011 | Yoshida | 297/408 |
| 2003/0098596 A1 | 5/2003 | Andreasson et al. | |
| 2004/0217641 A1 | 11/2004 | Lampke et al. | |
| 2005/0248198 A1 | 11/2005 | Fowler et al. | |
| 2007/0284929 A1 * | 12/2007 | Keller et al. | 297/408 |
| 2008/0211267 A1 | 9/2008 | Linardi et al. | |
| 2009/0179475 A1 * | 7/2009 | Haase | 297/408 |

FOREIGN PATENT DOCUMENTS

| | | |
|---|---|---|
| GB | 2441650 A | 3/2008 |
| JP | 11-11199 | 1/1999 |
| JP | 11-137369 | 5/1999 |
| JP | 2000-270959 | 10/2000 |
| JP | 2002-85191 | 3/2002 |
| JP | 2006-141855 | 6/2006 |
| JP | 2008-195297 | 8/2008 |

* cited by examiner

ARMREST ASSEMBLY FOR A SEAT

FIELD OF THE INVENTION

This invention relates to motor vehicles and, in particular, to a latching mechanism for a head restraint to hold the head restraint in a preferred rotational position when in use as a head restraint.

BACKGROUND OF THE INVENTION

It is well-known to provide a motor vehicle rear seat with a head restraint attached to an upper edge of the seat to limit rearward head movement of an occupant during a collision thereby minimizing the risk of injury to a neck of the occupant. It is further known to slidingly attach such a head restraint so as to permit the height of the head restraint to be adjusted to suit the height of the occupant requiring its support. One problem of the increased use of head restraints on rear seats of motor vehicles is that even when the head restraint is fully lowered, it considerably reduces rear visibility if the seat is not being occupied. To overcome this problem it has been proposed to use an inverted 'L' shaped head restraint hereinafter referred to as a 'shingle head restraint' that has a leg that overlies a front upper portion of a backrest of the seat when the shingle head restraint is fully lowered and a body portion that rests upon an upper edge, of the backrest when the shingle head restraint is fully lowered. The body portion of the shingle head restraint is of relatively small height so as to reduce the loss of rear visibility when the shingle head restraint is not in use.

It is an advantage of such a shingle head restraint that the overlying leg reduces the probability of an occupant utilizing the seat while the head restraint is in a lowered unsafe position due to the uncomfortable position an occupant has to adopt if the head restraint is overlying the front surface of the backrest.

It is further known from, for example, DE 4015872 to provide a head restraint attached to a foldable armrest so as to provide, when the armrest is folded up, safe seating for three occupants in a side by side relationship and, when the armrest is folded down, safe seating for two occupants separated by the armrest.

A disadvantage of the armrest shown in DE 4015872 is that the length of the armrest is shorter than is desirable. This is because a conventional bun-shaped head restraint is used and so the top edge of the armrest when it is folded up must be located below the top edges of the adjoining backrests so as to provide a recess for the head restraint to stow in order to provide good rear visibility when the head restraint is not in use.

SUMMARY OF THE INVENTION

According to one aspect of the present invention, an armrest assembly for a seat is provided. The armrest assembly includes an armrest portion, a shingle head restraint portion moveably attached to one end of the armrest portion so as to permit the shingle head restraint to be moved towards and away from the one end of the armrest portion, and a height adjuster to selectively secure the head restraint in one of a number of predetermined displaced positions relative to the armrest portion. The armrest portion is moveable from a folded up position to a folded down position. The head restraint portion is pivotably mounted for rotation about a substantially horizontal axis and includes a head restraint rotation latching mechanism comprising a latching member biased into engagement with part of the head restraint so as to hold the head restraint in a preferred rotational position. The armrest assembly further includes a means to automatically disengage the latching member only when the head restraint is brought into close proximity to the armrest portion to permit rotation of the head restraint portion about the substantially horizontal axis.

According to another aspect of the present invention, an armrest assembly for a seat is provided that includes an armrest portion, a head restraint portion moveably attached to one end of the armrest portion so as to permit the shingle head restraint to be moved towards and away from the one end of the armrest portion, and a height adjuster to selectively secure the head restraint in one of a number of predetermined displaced positions relative to the armrest portion. The armrest portion is moveable from a folded up position to a folded down position. The head restraint portion is pivotably mounted for rotation about a substantially horizontal axis and includes a head restraint rotation latching mechanism comprising a latching member biased into engagement with part of the head restraint so as to hold the head restraint in a preferred rotational position. One of the latching member and the armrest portion has a projection that displaces the latching member when the head restraint is brought into close proximity to the armrest portion so as to disengage the latching member from the head restraint only when the head restraint is brought into close proximity to the armrest portion to permit rotation of the head restraint portion about the substantially horizontal axis.

According to a further aspect of the present invention, a seat armrest assembly is provided that includes an armrest moveable between folded up and down positions, a head restraint moveable attached to the armrest and pivotably mounted for rotation, a height adjuster to adjust head restraint height, and a latching mechanism holding the head restraint in a preferred rotational position and disengageable only when the head restraint is brought into close proximity to the armrest to permit rotation of the head restraint.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
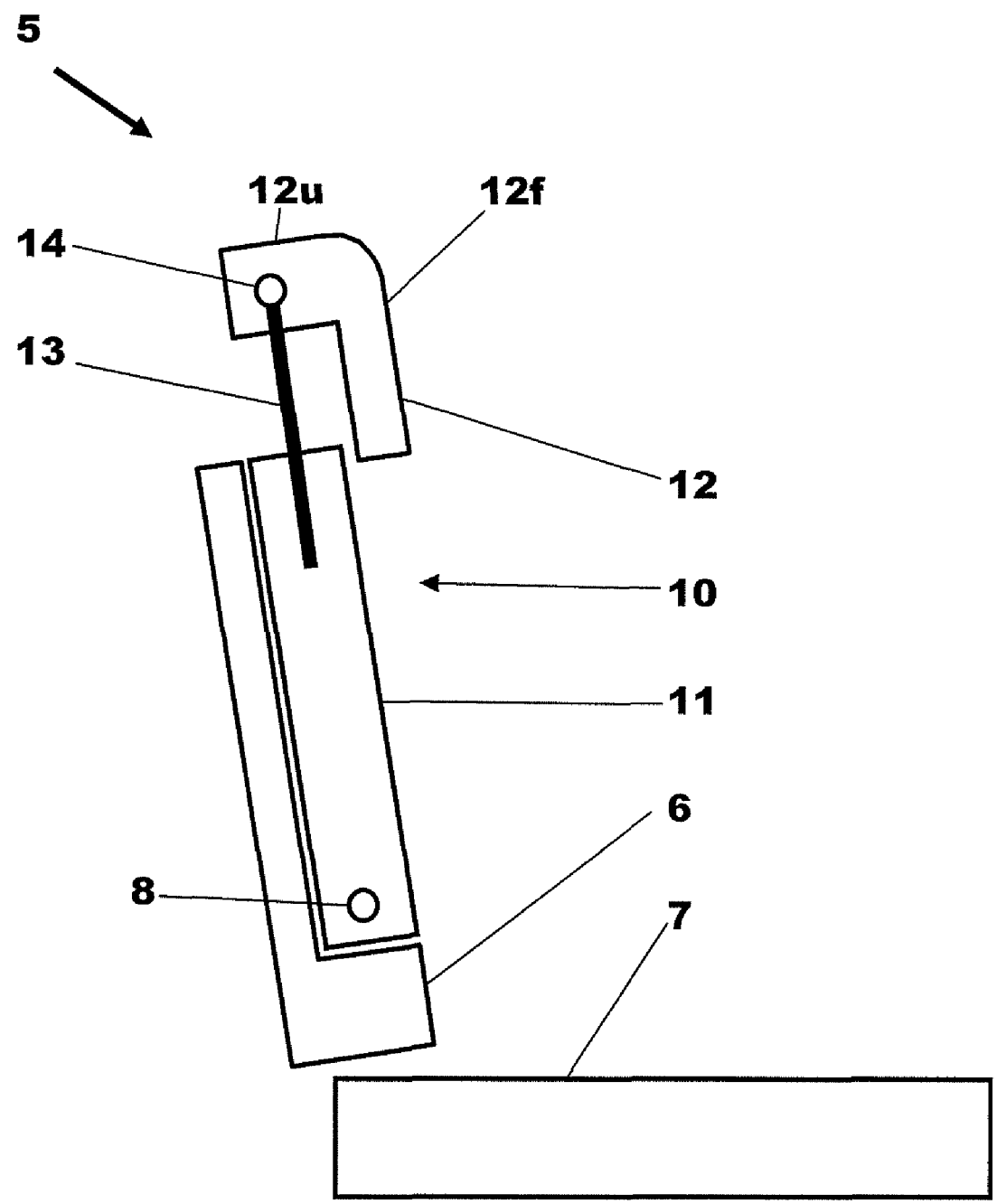
FIG. 1 is a side view of part of a seat assembly having an armrest assembly according to one embodiment showing a head restraint in a raised or in-use position.

With particular reference to FIGS. 1 to 11 there is shown part of an asymmetric split seat assembly having a first backrest (not shown), a first seat squab (not shown) each of which constitutes forty percent of the total width of the seat assembly and second backrest 6 and seat squab 7 each of which constitutes sixty percent of the total width of the seat assembly and an armrest assembly 10 which constitutes twenty percent of the total width of the seat assembly and is located in a recess formed in the second backrest 6 so that when the armrest assembly 10 is folded down a seating width of approximately forty percent of the width of the seat lies to each side of the armrest assembly 10 according to one embodiment. The visible parts of the seat assembly are indicated by the general reference numeral 5 in FIGS. 1 to 11.

The armrest assembly 10 includes an armrest 11 and a head restraint 12. The armrest 11 is connected near to one end by a pivot means 8 to part of the structure of the seat assembly 5. The head restraint 12 is slidingly attached to an opposite end of the armrest 11 by means of a pair of spaced apart stays 13 which are engaged in guides (not shown) attached to a support frame of the armrest 11. At least one of the stays 13 has a number of notches 15 formed in it which cooperate with a height adjuster 16 so as to provide predetermined head restraint heights. The height adjuster 16 is biased into engagement with one of the four notches 15 by a spring (not shown) and is released by an operator sliding the height adjuster 16 out of engagement with a respective notch 15 against the action of the spring bias.

Each of the stays 13 is fastened at one end to a rotary support (not shown) for a shaft 14 fixed to a support structure (not shown) of the head restraint 12. The head restraint 12 is pivotable about a substantially horizontal axis extending along the length of the shaft 14.

A rotation latching mechanism 20 is provided to hold the head restraint 12 in a preferred rotational position so as to provide good support for the head of an occupant in the event of a crash. The rotation latching mechanism 20 comprises a recess in the form of a keyway 25 formed in the shaft 14 and a latching member 21 biased into engagement with the keyway 25 by a tension spring 22. The latching member 21 has an end portion in the form of a pushrod 23 for engagement with an end face 17 of the armrest 11.

Figure 2:
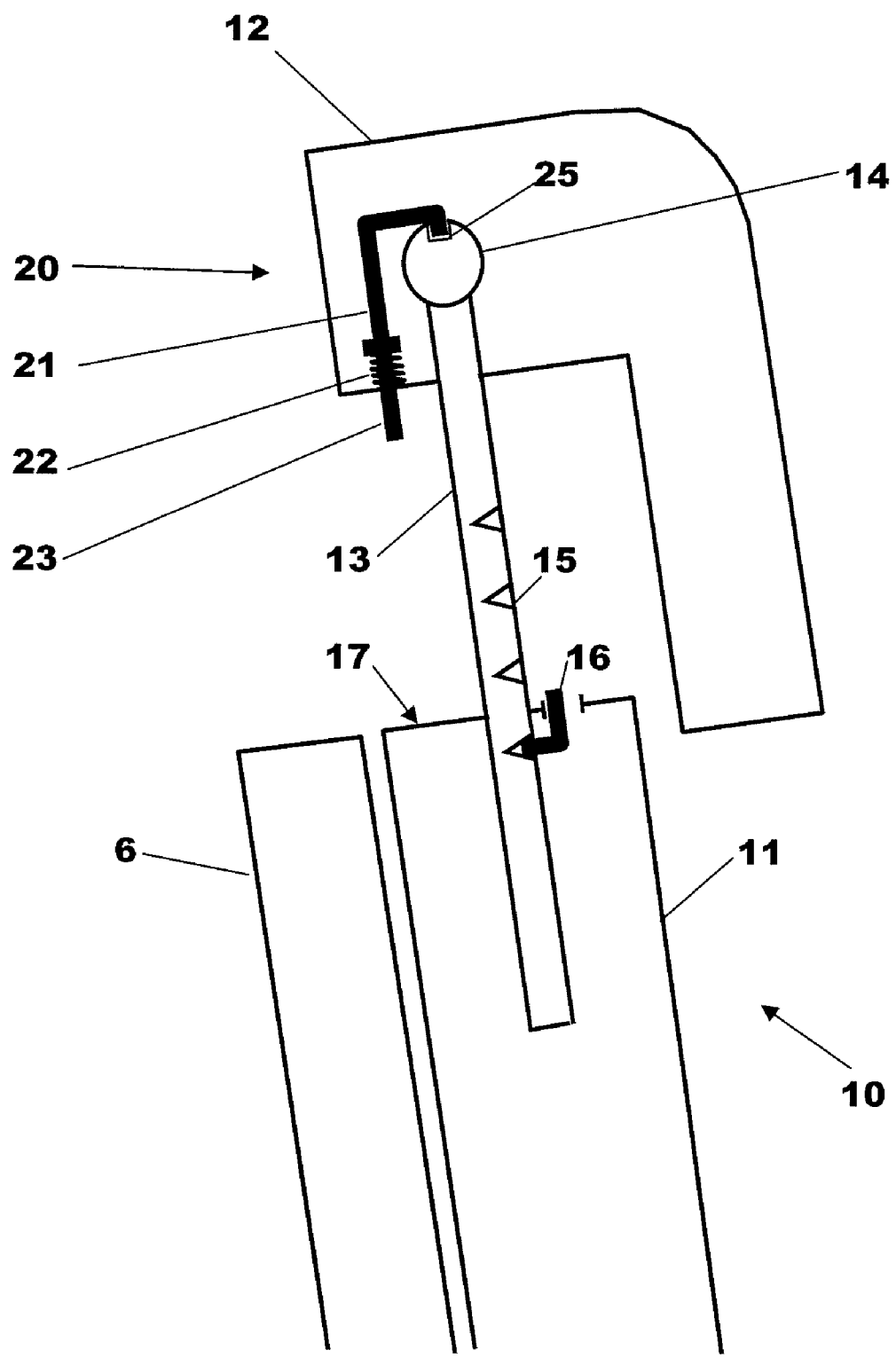
FIG. 2 is an enlarged side view of part of the armrest assembly shown in FIG. 1 showing a first embodiment of a rotation latching mechanism in a latched state.
Figure 3:
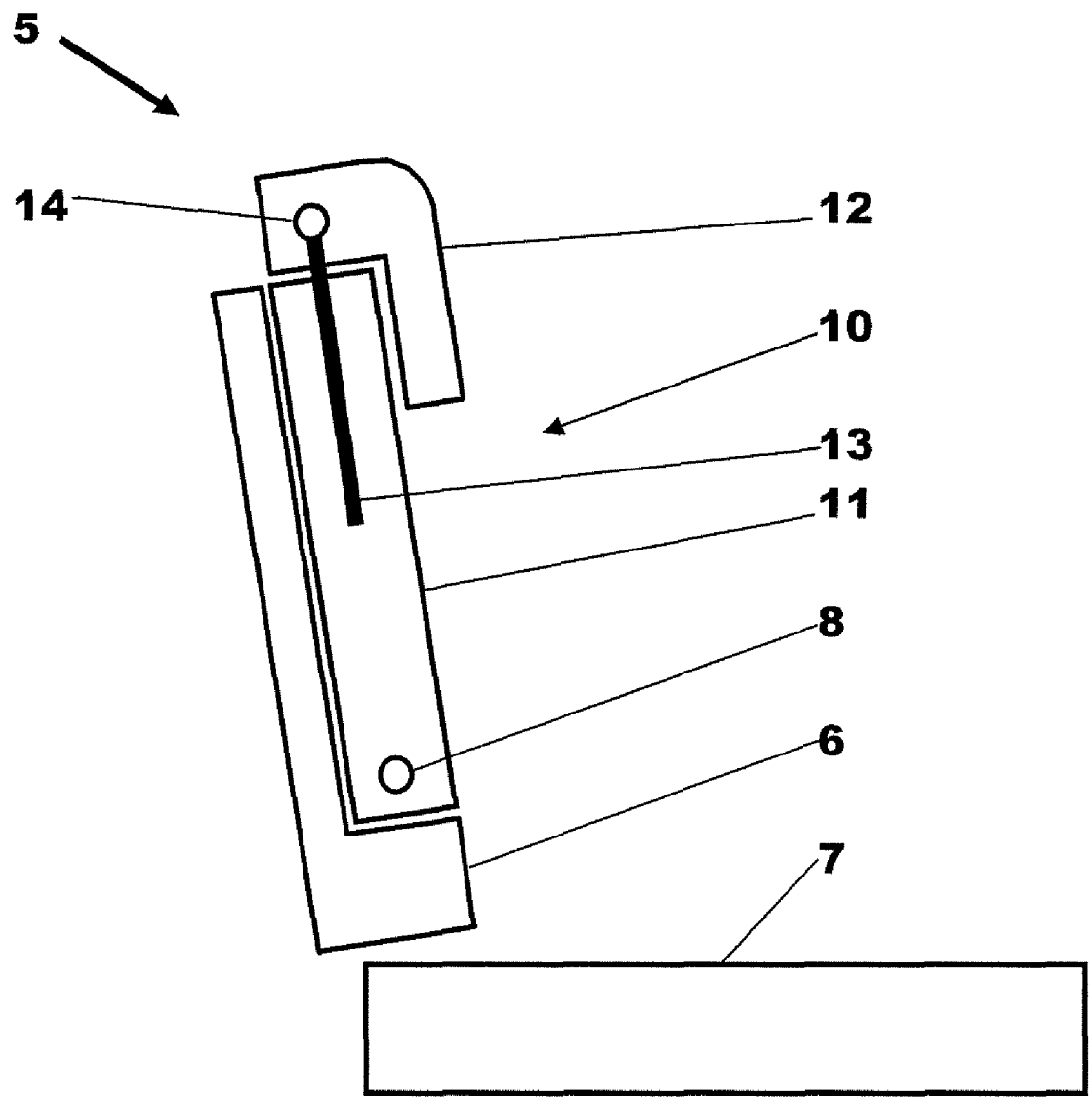
FIG. 3 is a side view similar to FIG. 1 but showing the head restraint in a lowered position.

As shown in FIG. 2 when the head restraint 12 is in a raised position, the pushrod 23 does not interact with the end face of the armrest 11 and the latching member 21 is engaged with the keyway 25 thereby preventing rotation of the head restraint 12.

Figure 4:
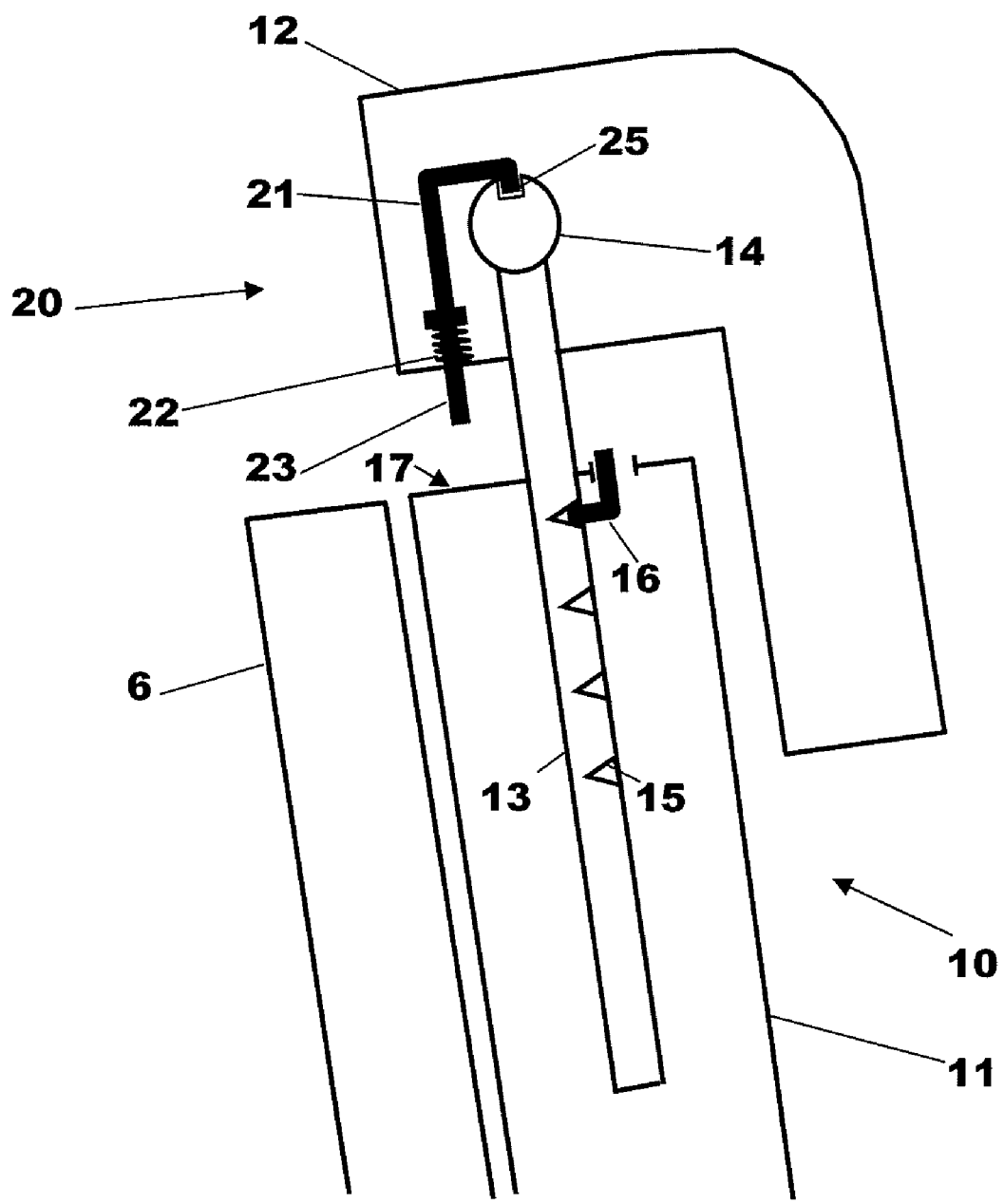
FIG. 4 is a side view similar to that shown in FIG. 2 but showing the head restraint in a partially lowered position.

As shown in FIG. 4, the latching member 21 remains engaged with the keyway 25 thereby preventing rotation of the head restraint 12 even when the head restraint 12 is moved to its lowest safe usable position.

Figure 5:
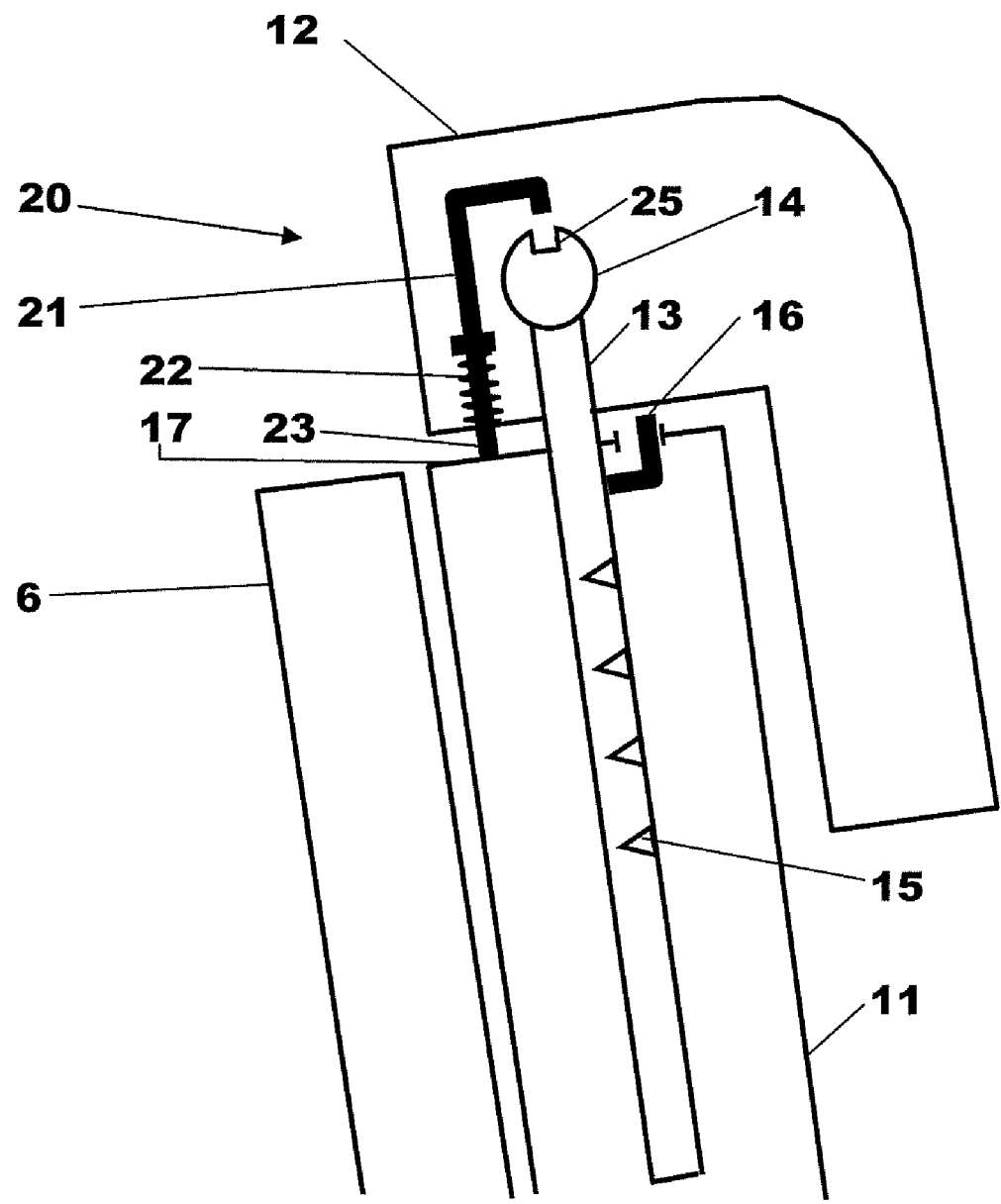
FIG. 5 is an enlarged side view of part of the armrest assembly shown in FIG. 3 showing the rotation latching mechanism in an unlatched state.
Figure 6:
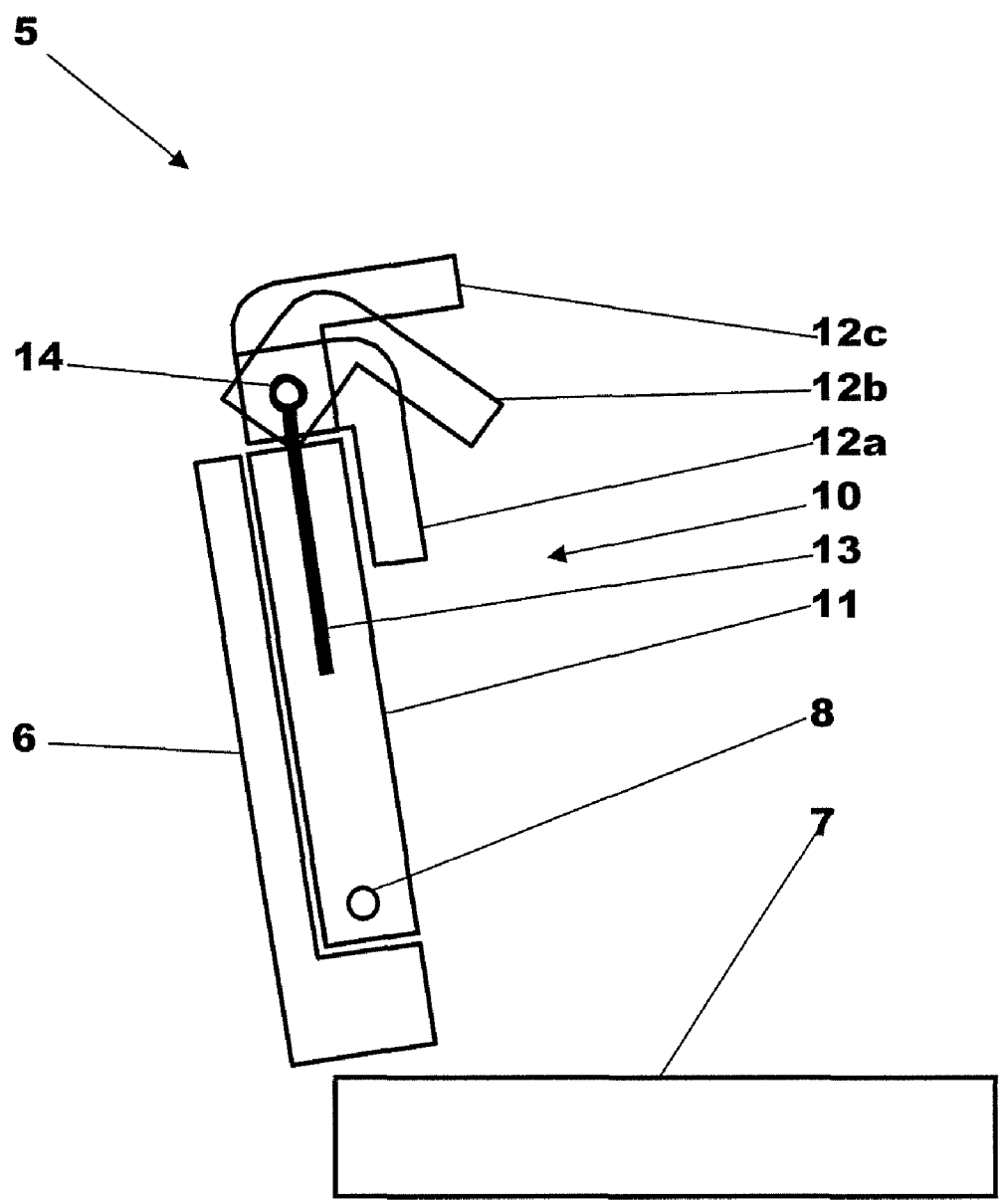
FIG. 6 is a side view of the seat assembly shown in FIGS. 1 and 3 showing rotational movement of the head restraint after the latching mechanism has been unlatched.

However, when the head restraint 12 is moved closer to the end face 17 of the armrest 11 than its lowest safe usable position into close proximity (circa 5 mm) with the end face 17 of the armrest 11, the pushrod 23 contacts the end face 17 of the armrest 11. If the head restraint 12 is then moved closer to the end face 17 of the armrest 11 the latching member 21 will be displaced out of engagement with the keyway 25 against the action of the spring 22 as shown in FIG. 5. When the latching mechanism 20 is in this unlatched state the head restraint 12 is free to rotate from its normal head restraint rotary position as indicated by the reference numeral 12a on FIG. 6 to an armrest support rotary position as indicated by the reference numeral 12c on FIG. 6 via an intermediate position as indicated by the reference numeral 12b on FIG. 6.

Figure 7:
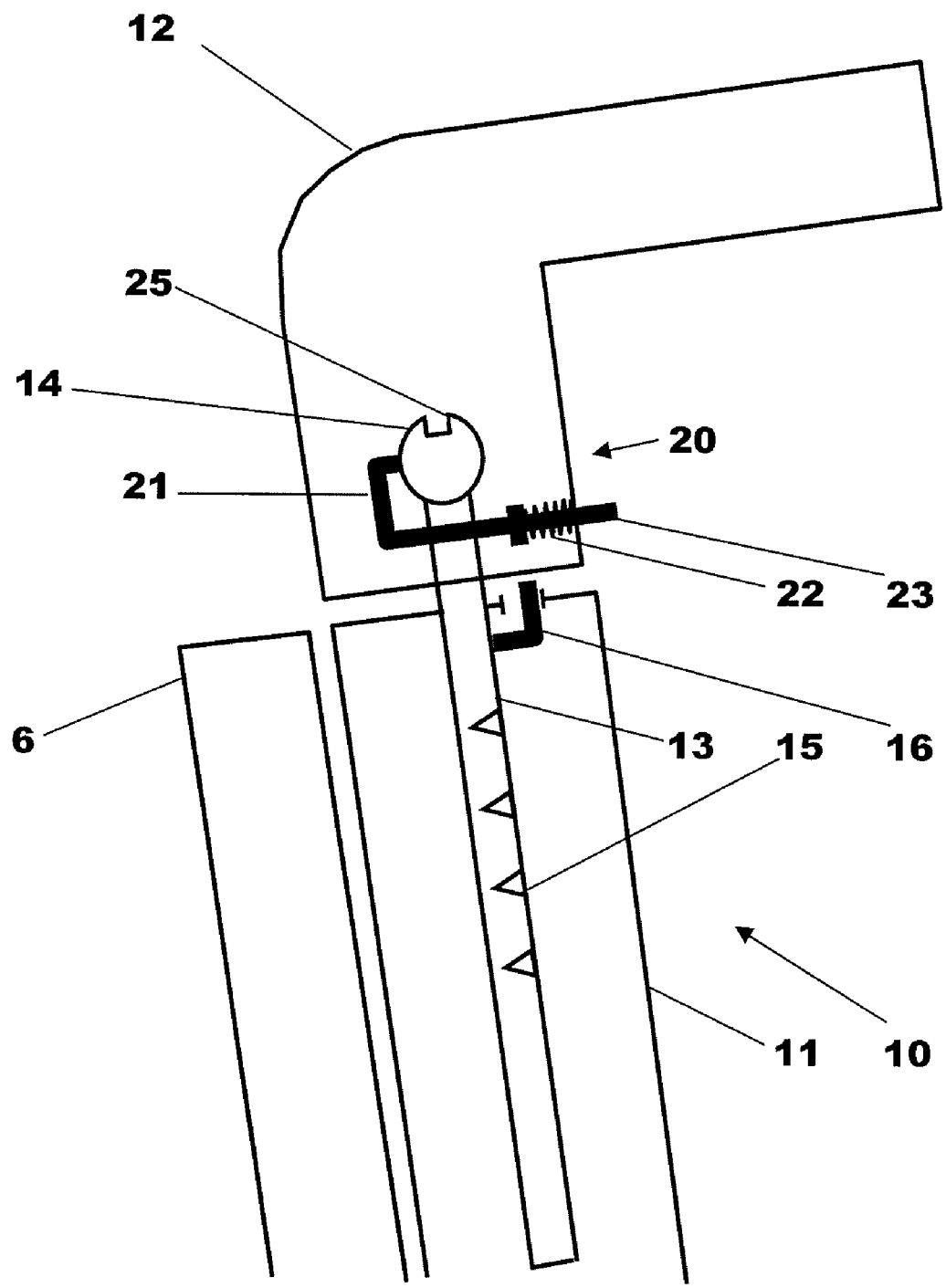
FIG. 7 is an enlarged side view of part of the armrest assembly shown in FIG. 8 showing the rotation latching mechanism after the latching mechanism has been unlatched or released and the head restraint has been rotated.
Figure 8:
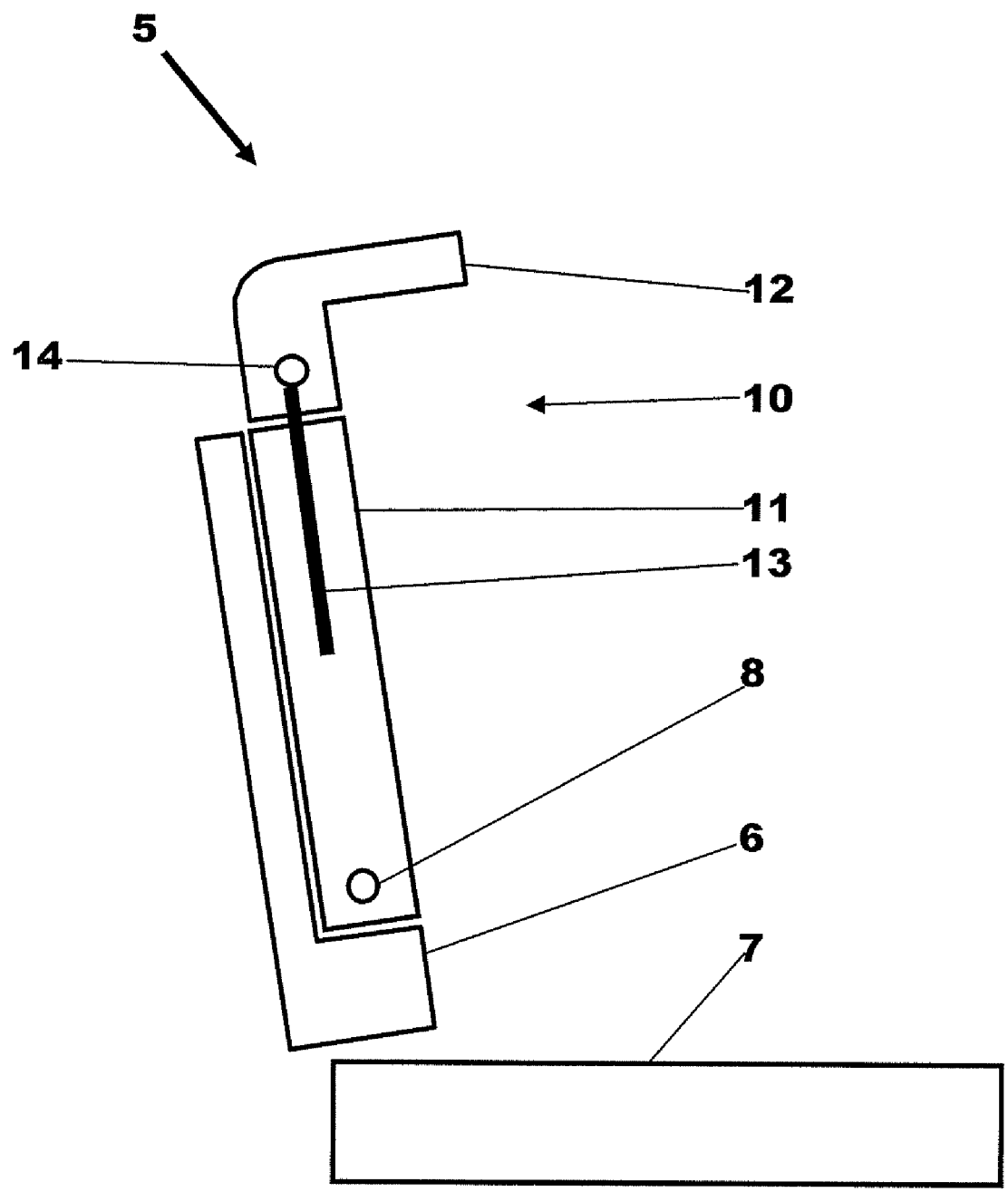
FIG. 8 is a side view of the seat assembly shown in FIGS. 1, 3 and 6 showing the head restraint in a fully rotated position.

As shown in FIG. 7 when the head restraint 12 has been rotated to the armrest support rotary position, the latching member 21 cannot engage the keyway 25 and the head restraint 12 is free to rotate. An end stop (not shown) may be provided to prevent over rotation of the head restraint 12.

Figure 9:
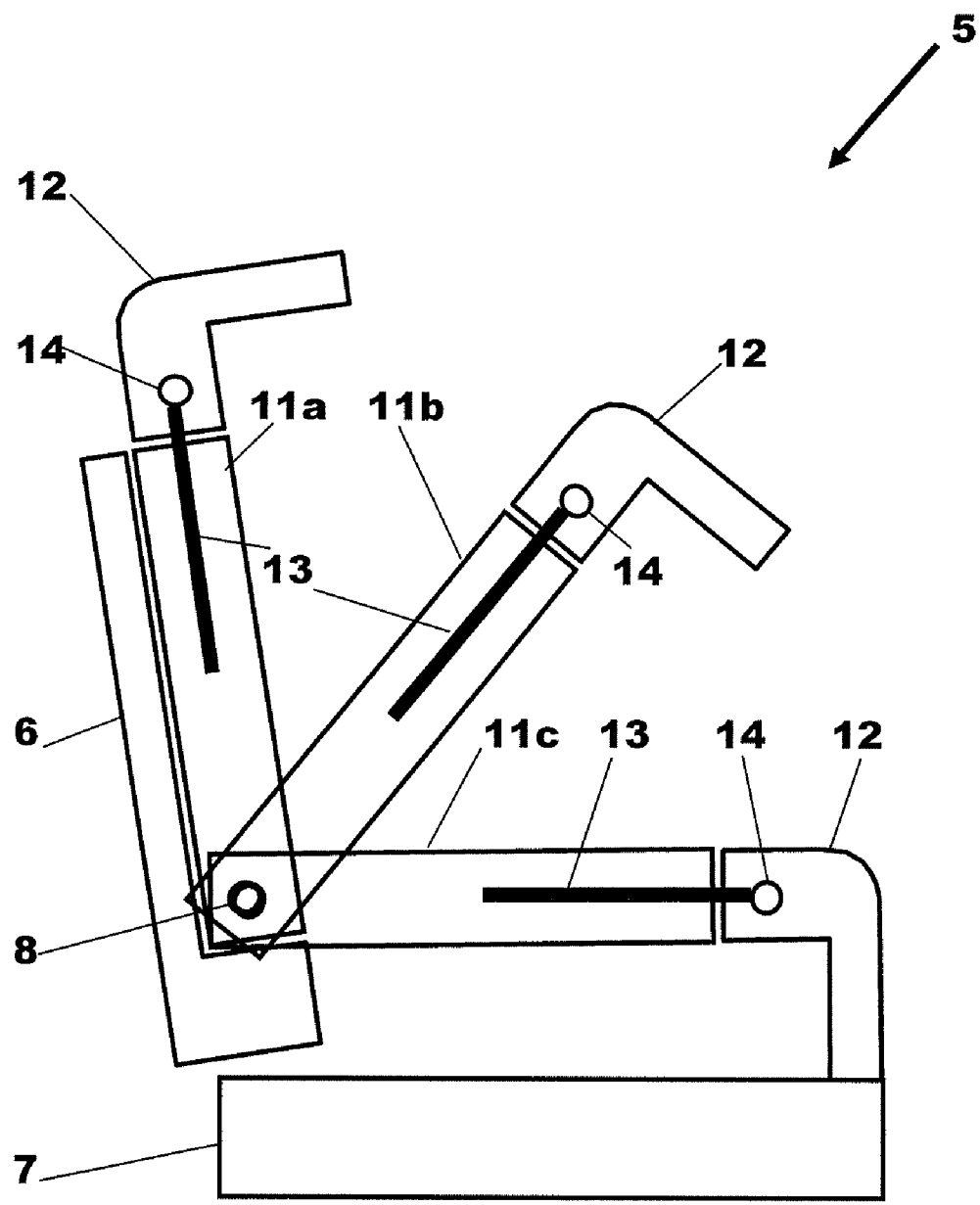
FIG. 9 is a side view of the seat assembly shown in FIGS. 1, 3, 6 and 8 showing the armrest assembly in folded up, folded down and intermediate positions.

As indicated in FIG. 9, the armrest 11 is rotatable about the pivot means 8 from its folded up position, as indicated by the reference numeral 11a, to its folded down position, as indicated by the reference numeral 11c, via an intermediate position, as indicated by the reference numeral 11b. This motion from folded up to folded down can conveniently be performed by an occupant pulling on the head restraint 12. Note that rotation of the head restraint 12 could be performed simultaneously with forward rotation of the armrest 11 and it is not essential that the head restraint 12 is rotated to its armrest support rotary position before forward folding of the armrest 11 occurs.

Figure 10:
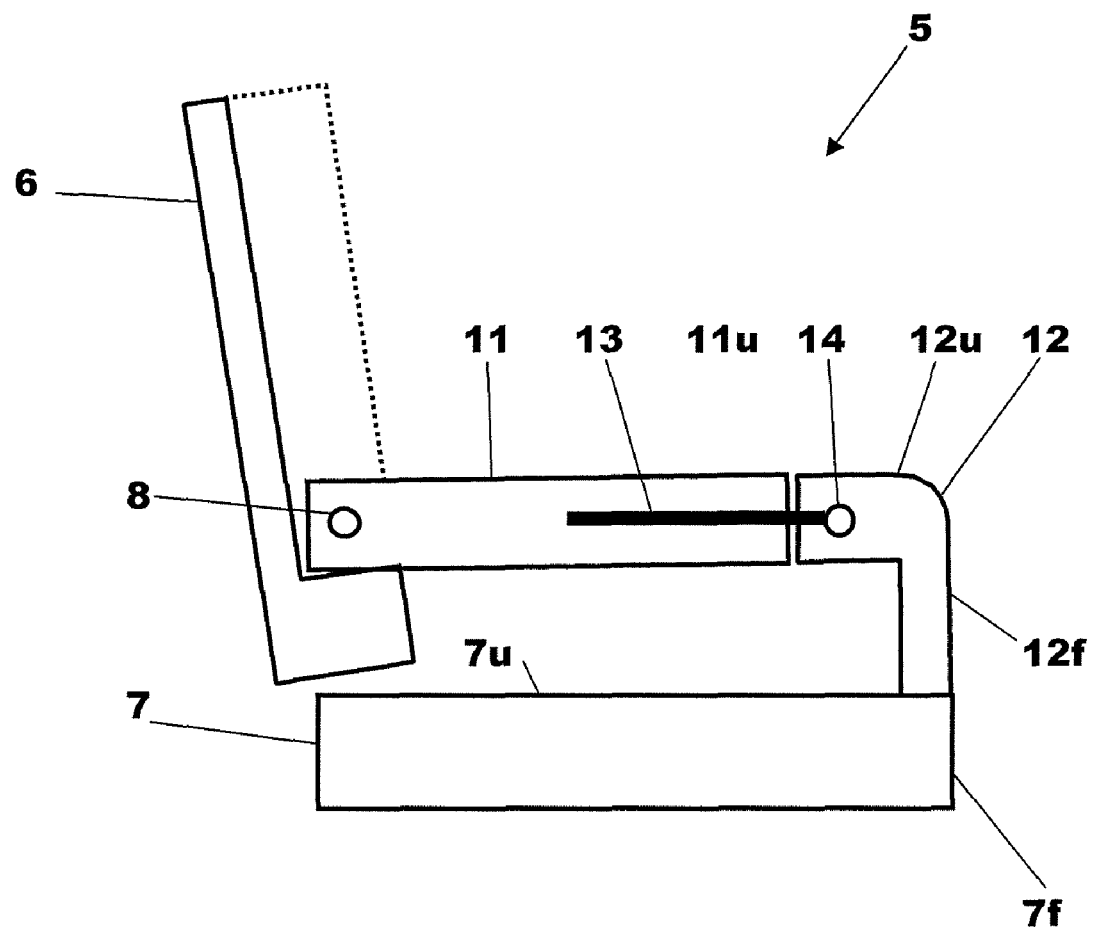
FIG. 10 is a side view of the seat assembly shown in FIGS. 1, 3, 6 and 8 showing the armrest assembly in the folded down position.

As indicated in FIG. 10, when the armrest 11 is folded down an upper surface 11u of the armrest 11 and an upper surface 12u of the head restraint form a virtually continuous surface thereby increasing the effective length of the armrest 11. Similarly a front surface 12f of the head restraint 12 is also aligned with a front face 7f of the seat squab 7 thereby improving the aesthetic appearance of the folded down armrest assembly 10.

When the armrest 11 is folded down, the head restraint 12 rests upon an upper surface 7u so that some of the load applied to the armrest 11 can be transferred to the seat squab 7 via the head restraint 12.

An armrest assembly 10 constructed according to this embodiment is therefore able to extend the full depth of the seat squab 7 and provides an aesthetically pleasing appearance by having head restraint surfaces 12f, 12u that align with adjacent surfaces 7f, 11u of the seat squab 7 and armrest 11.

Figure 11:
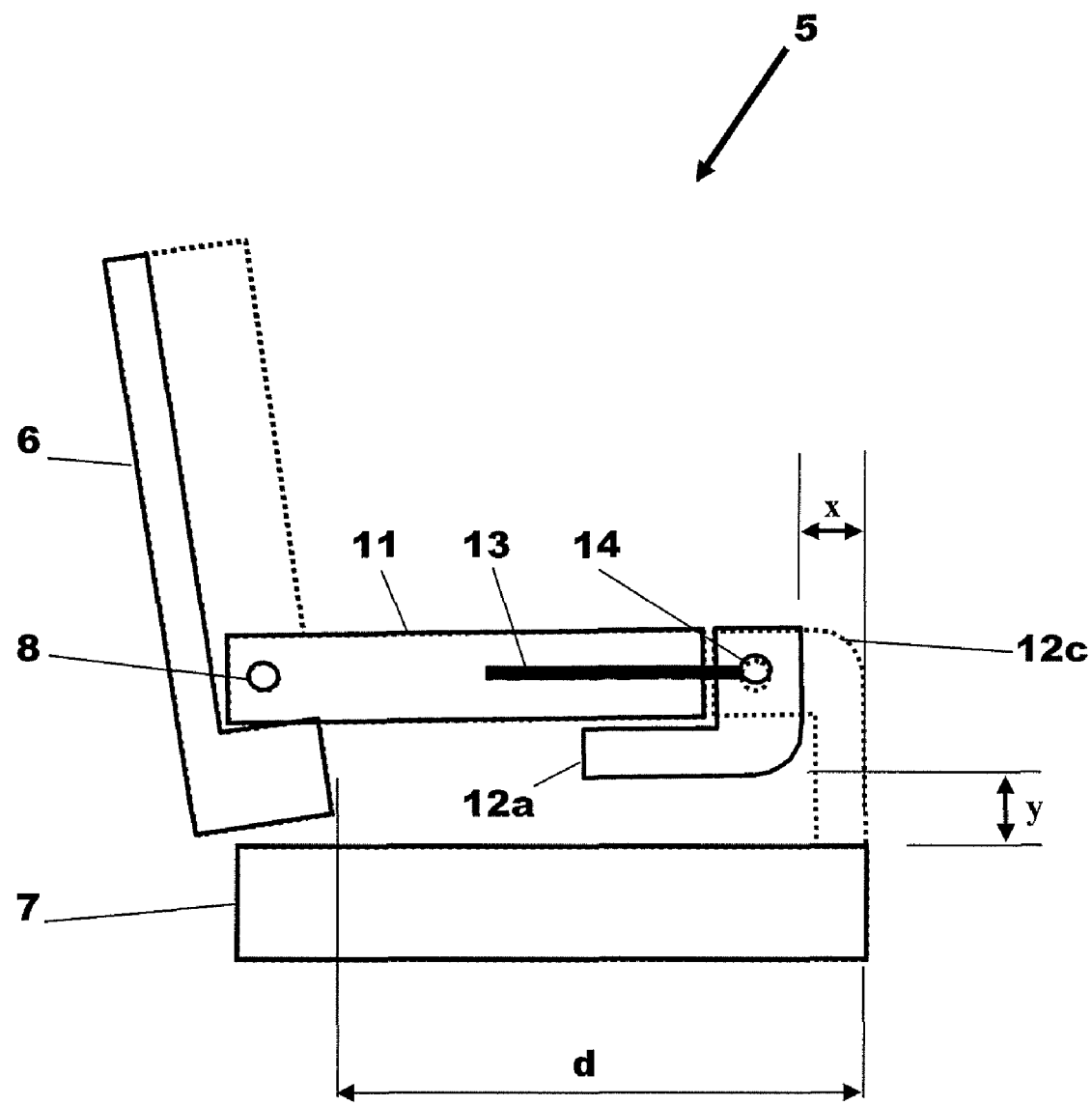
FIG. 11 is a side view similar to FIG. 10 showing the advantage of folding the head restraint when the armrest assembly is folded down.

FIG. 11 illustrates two advantages of rotating the head restraint 12. If the head restraint 12 is not rotated, it will occupy the position 12a, whereas if rotated, it occupies the position 12c. Firstly, the unrotated head restraint 12a does not lie upon the seat squab 7 as there is a gap 'y' between the head restraint 12a and the seat squab 7 and so no support to the armrest 11 can be provided. If the pivotal attachment 8 were to be lowered the distance 'y' so as to allow the head restraint 12a to lie upon the seat squab 7 then the armrest 11 would be too low to be used comfortably. Secondly, the unrotated head restraint 12a provides an armrest that is shorter by the distance 'x' compared to the case when the head restraint 12c is rotated. Note that an armrest assembly constructed according to this embodiment provides an armrest that extends substantially the full depth 'd' of the seat squab 7 when the armrest 11 is folded down.

Although the armrest assembly 10 has been described with reference to a single rotation latching mechanism, it will be appreciated that if the head restraint 12 is, as described above, supported by two support stems, each of the support stems may have a rotation latching mechanism attached to it. It will be further appreciated that the head restraint 12 may be supported by a single support stem and that the invention is not limited to use with an arrangement using two support stems for the head restraint.

One of the advantages of the armrest assembly 10 is that the rotation latching mechanism 20 is automatically released when the head restraint 12 is fully lowered but at all other times is engaged thereby ensuring that the head restraint 12 is maintained in the preferred rotary position whenever it is in a usable safe position. A second advantage of the armrest assembly 10 is that because no operator controls are provided for the rotary latching mechanism the latching mechanism cannot be accidentally released by an occupant of the vehicle. A third advantage of the armrest assembly 10 is that the latching mechanism is simple to unlatch because an occupant merely has to move the head restraint 12 into close proximity to the armrest 11 to release the latching mechanism.

Figure 12:
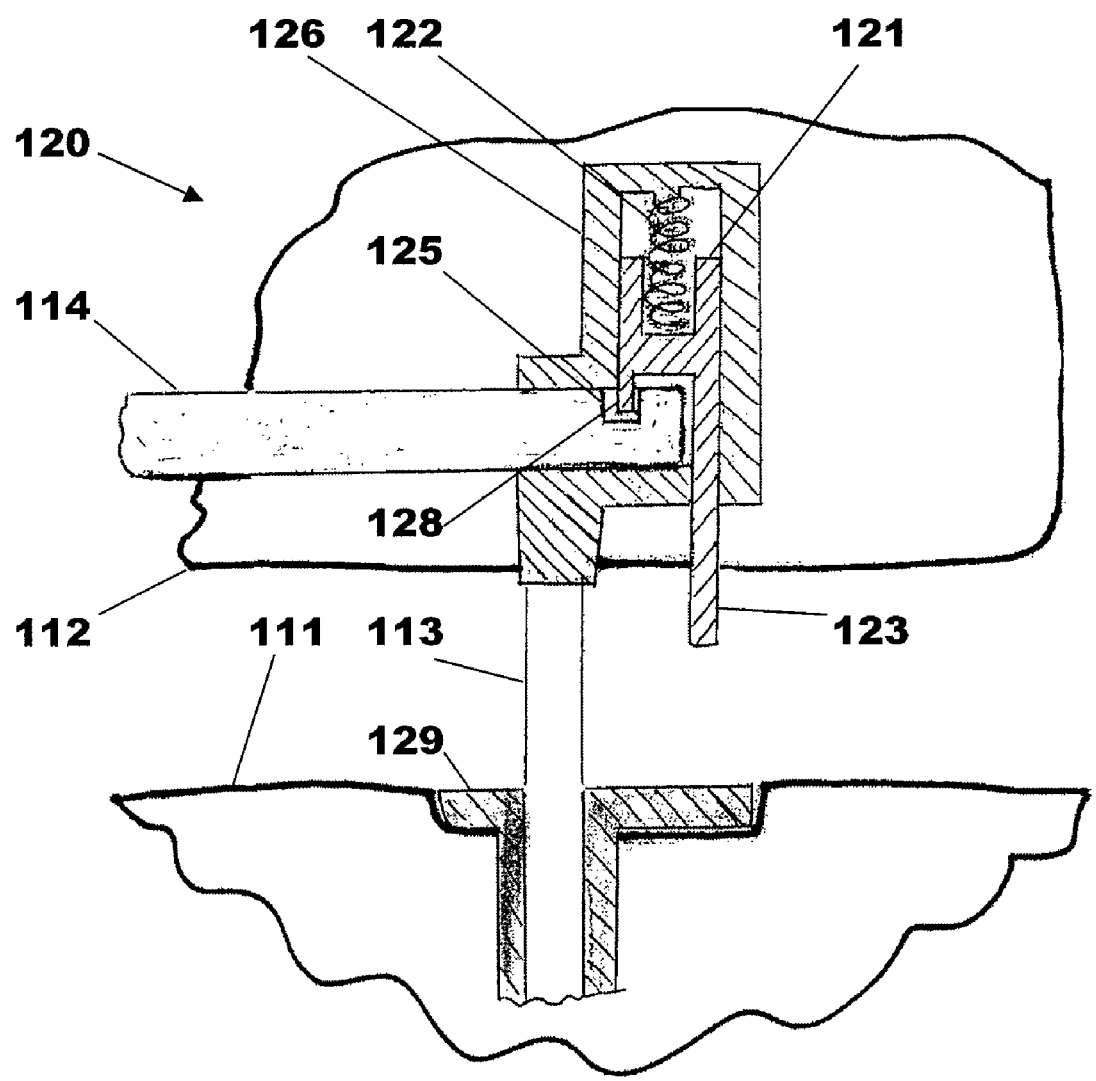
FIG. 12 is a front view of part of a second embodiment of a rotation latching mechanism.

With reference to FIG. 12 there is shown a second embodiment of a rotation latching mechanism 120 for a head restraint 112. The latching mechanism 120 is, as before, attached to an upper end of a support stem 113 slidingly supported by a rigid support bush 129 fastened to an upper edge of an armrest 111.

The head restraint 112 includes a shaft 114 fastened to a frame (not shown) of the head restraint 112 to provide a pivot means for the head restraint 112. The shaft 114 is rotatably support by a housing 126 forming part of the rotation latching mechanism 120 attached to the support stem 113.

The latching mechanism 120 further comprises a recess 125 formed in the shaft 114 and a finger 128 formed on a latching member 121 biased into engagement with the recess 125 by a compression spring 122 so as to prevent rotation of the head restraint 112. The latching member 121 is supported in a cavity formed in the housing 126 and has a pushrod 123 portion for engagement with an end face of the rigid support bush 129.

As previously described, when the head restraint 112 is brought into close proximity to the armrest 111 abutment of the pushrod 123 against the support bush 129 will cause the finger 128 to be moved out of engagement with the recess 125 against the action of the spring 122 thereby allowing the head restraint 112 to be rotated from a desired position.

As before, the rotation latching means 120 is only unlatched when the head restraint 112 is moved into close proximity to the armrest 111. The magnitude of this close proximity is determined by the length of the pushrod 123, the distance it projects from the head restraint 112 and the distance the finger 128 has to be displaced to disengage it from the recess 125.

It will be appreciated that various alternative embodiments of the latching mechanism could be constructed without departing from the invention. For example, the latching member could have a recess or aperture and the head restraint could have a projection or pin for engagement with the recess or aperture. As yet another alternative, the projection or pushrod could be formed on the armrest and not on the latching member. As yet one more alternative, the head restraint may have a bush into which a shaft attached to the support stem is engaged.

The use of a shingle head restraint with such a design allows the use of an armrest that extends the full height of the adjacent seat backs and which when the armrest is folded down will provide a longer more useable armrest.

It is desirable to rotate the head restraint when the armrest is folded down from a preferred orientation required to provide good head support when the armrest is folded up. This rotation is required in order to maximize the length of the armrest when it is folded down and to permit the head restraint to lie upon a squab of the seat thereby changing the armrest from a cantilever structure to a beam structure supported at each end. The use of a beam structure has the advantage of reducing the loading on the connection between the armrest and the structure of the seat.

In order for an occupant to easily transform the armrest and head restraint from the folded up position to the folded down position it is desirable to provide a simple latching mechanism for the head restraint that can only be released when the head restraint is in a non-use position and that is always latched in the correct rotational position when the head restraint is in an in use or raised position. The assembly provides a rotation latching mechanism for a head restraint of a motor vehicle.

Accordingly, an armrest assembly for a seat is provided that comprises an armrest portion, a shingle head restraint portion moveably attached to one end of the armrest portion so as to permit the shingle head restraint to be moved towards and away from the one end of the armrest portion, and a height adjuster to selectively secure the head restraint in one of a number of predetermined displaced positions relative to the armrest portion, the armrest portion being moveable from a folded up position to a folded down position, wherein the head restraint portion is pivotably mounted for rotation about a substantially horizontal axis and includes a head restraint rotation latching mechanism comprising a latching member biased into engagement with part of the head restraint so as to hold the head restraint in a preferred rotational position, and a means to automatically disengage the latching member only when the head restraint is brought into close proximity to the armrest portion to permit rotation of the head restraint portion about the horizontal axis.

This has the advantage that a separate operator controlled latch does not need to be operated in order to release the head restraint for rotation thereby simplifying the operation.

One of the latching member and the armrest portion may have a projection that displaces the latching member when the head restraint is brought into close proximity with the armrest portion so as to disengage the latching member from the head restraint. The projection may be formed as part of the latching member. The projection may be a rod that is located so as to abut against a rigid surface on the armrest portion when the head restraint is brought into close proximity to the armrest portion. The rod may slide axially within the head restraint portion. A spring may be used to bias the latching member into engagement with part of the head restraint.

The part of the head restraint may be a support rod used to pivotally support the head restraint, and one of the latching member and the support rod may have a projection arranged for engagement with a recess formed in the other of the support rod and the latching member so as to hold the head restraint in the preferred rotational position. The latching mechanism may be automatically released by interaction between a part of the latching mechanism and an adjacent end face of the armrest portion. Close proximity with the armrest portion is a position that is nearer to the armrest portion than the nearest predetermined displaced position in which the head restraint can be secured in position by the height adjuster.

The armrest assembly may be an armrest assembly for a seat comprising two seat squabs, two seat backs and two head restraints, each of the two head restraints being located on an upper edge of a respective one of the two seat backs, wherein the armrest portion is moveable from the folded up position in which the seat can accommodate up to three passengers in a side by side relationship and in which the head restraint portion of the armrest assembly is located between the two head restraints attached to the seat backs to a folded down position in which the armrest portion overlies one of the seat squabs so as to divide the seat into two for occupation by two or less passengers and the head restraint portion rests upon the one of the seat squabs. The combined length of the folded down armrest portion and headrest portion may be substantially equal to the depth of the one seat squab. The head restraint portion may rest upon the one seat squab when the armrest portion is in the folded down position.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An armrest assembly for a seat comprising an armrest portion, a shingle head restraint portion moveably attached to one end of the armrest portion so as to permit the shingle head restraint to be moved towards and away from the one end of the armrest portion, and a height adjuster to selectively secure the head restraint in one of a number of predetermined displaced positions relative to the armrest portion, the armrest portion being moveable from a folded up position to a folded down position, wherein the head restraint portion is pivotably mounted for rotation about a substantially horizontal axis and includes a head restraint rotation latching mechanism comprising a latching member biased into engagement with part of the head restraint so as to hold the head restraint in a preferred rotational position, and a means to automatically disengage the latching member only when the head restraint is brought into close proximity to the armrest portion to permit rotation of the head restraint portion about the substantially horizontal axis.

2. The armrest assembly as claimed in claim 1, wherein one of the latching member and the armrest portion has a projection that displaces the latching member when the head restraint is brought into close proximity to the armrest portion so as to disengage the latching member from the head restraint.

3. The armrest assembly as claimed in claim 2, wherein the projection is formed as part of the latching member.

4. The armrest assembly as claimed in claim 3, wherein the projection is a rod that is located so as to abut against a rigid surface on the armrest portion when the head restraint is brought into close proximity to the armrest portion.

5. The armrest assembly as claimed in claim 4, wherein the rod slides axially within the head restraint portion.

6. The armrest assembly as claimed in claim 1, wherein a spring is used to bias the latching member into engagement with part of the head restraint.

7. The armrest assembly as claimed in claim 1, wherein the part of the head restraint is a support rod used to pivotally support the head restraint, and one of the latching member and the support rod has a projection arranged for engagement with a recess formed in the other of the support rod and the latching member so as to hold the head restraint in the preferred rotational position.

8. The armrest assembly as claimed in claim 1, wherein the latching mechanism is automatically released by interaction between a part of the latching mechanism and an adjacent end face of the armrest portion.

9. The armrest assembly as claimed in claim 1, wherein close proximity with the armrest portion is a position that is nearer to the armrest portion than the nearest predetermined displaced position in which the head restraint can be secured in position by the height adjuster.

10. The armrest assembly as claimed in claim 1, wherein the armrest assembly is for a seat comprising two seat squabs, two seat backs and two head restraints, each of the two head restraints being located on an upper edge of a respective one of the two seat backs, wherein the armrest portion is moveable from the folded up position in which the seat can accommodate up to three passengers in a side by side relationship and in which the head restraint portion of the armrest assembly is located between the two head restraints attached to the seat backs to a folded down position in which the armrest portion overlies one of the seat squabs so as to divide the seat into two for occupation by two or less passengers and the head restraint portion rests upon the one of the seat squabs.

11. The armrest assembly as claimed in claim 10, wherein the combined length of the folded down armrest portion and headrest portion is substantially equal to the depth of the one seat squab.

12. An armrest assembly for a seat comprising an armrest portion, a head restraint portion moveably attached to one end of the armrest portion so as to permit the head restraint to be moved towards and away from the one end of the armrest portion, and a height adjuster to selectively secure the head restraint in one of a number of predetermined displaced positions relative to the armrest portion, the armrest portion being moveable from a folded up position to a folded down position, wherein the head restraint portion is pivotably mounted for rotation about a substantially horizontal axis and includes a head restraint rotation latching mechanism comprising a latching member biased into engagement with part of the head restraint so as to hold the head restraint in a preferred rotational position, and wherein one of the latching member and the armrest portion has a projection that displaces the latching member when the head restraint is brought into close proximity to the armrest portion so as to disengage the latching member from the head restraint only when the head restraint is brought into close proximity to the armrest portion to permit rotation of the head restraint portion about the substantially horizontal axis.

13. The armrest assembly as claimed in claim 12, wherein the projection is a rod that is located so as to abut against a rigid surface on the armrest portion when the head restraint is brought into close proximity to the armrest portion.

14. The armrest assembly as claimed in claim 13, wherein a spring is used to bias the latching member into engagement with part of the head restraint.

15. A seat armrest assembly comprising:
 an armrest moveable between folded up and down positions;
 a head restraint moveably attached to the armrest and pivotably mounted for rotation;
 a height adjuster to adjust head restraint height; and
 a latching mechanism holding the head restraint in a preferred rotational position and automatically disengageable only when the head restraint is brought into close proximity to the armrest to permit rotation of the head restraint about a horizontal axis.

16. The armrest assembly as claimed in claim 15, wherein the head restraint comprises a shingle head restraint.

17. The armrest assembly as claimed in claim 15, wherein the head restraint pivots relative to the armrest about the horizontal axis.

18. The armrest assembly as claimed in claim 12, wherein the head restraint comprises a shingle head restraint.

* * * * *